Patented Mar. 14, 1933                                                              1,900,994

UNITED STATES PATENT OFFICE

JOHANNES MÜLLER, OF HOMBERG-ON-THE-LOWER-RHINE, GERMANY, ASSIGNOR TO "SACHTLEBEN" AKTIENGESELLSCHAFT FÜR BERGBAU UND CHEMISCHE INDUSTRIE, OF HOMBERG-ON-THE-LOWER-RHINE, GERMANY, A GERMAN COMPANY

PURIFYING OF NATURAL HEAVY SPAR

No Drawing. Original application filed May 6, 1929, Serial No. 360,987, and in Germany July 30, 1928. Divided and this application filed July 2, 1930. Serial No. 465,456.

The object of the invention is a method of completely purifying natural heavy spar containing impurities, by simple means.

It is known that the impurities which colour many kinds of heavy spar, consist preferably of aluminium —, iron — and manganese oxides, as well as peroxides or also salts of these metals. Besides these, there are heavy spars, which in addition to iron oxide, also contain bitumen as impurity. In order to remove the metallic impurities from heavy spars free from bitumen, the methods hitherto adopted were either to heat the ground heavy spar with mineral acids, in which case the said metal oxides passed practically into solution and were removed by washing, or the heavy spar was mixed with sodium bisulphate, the mixture roasted below sintering temperature and leached out. In the case of heavy spars containing bitumen however, these methods were unsuccessful.

A method has been found which can be used both for heavy spars containing bitumen and those free from bitumen. In my copending application for Letters Patent Serial No. 360,987 of which this application is a division I have described and claimed a method of purifying natural heavy spar consisting in calcining under reducing conditions lump spar, whereby small amounts of barium sulphide are produced, and quenching the calcined spar. During the quenching operation the barium sulphide is dissolved in water and reacts wth the heavy metal compounds, which are transformed into sulphides. These sulphides are removed for the most part by mere washing with water; those which remain are removed by treating with acid to render them water-soluble and then washing out with water. According to the present invention the crude heavy spar can be calcined in pieces or in the ground state with an oxidizing action at 1300–1350° C. In general it is sufficient if the calcination is carried out for a short period of time.

The glowing heavy spar is quenched in dilute solutions containing sulphide, for instance barium sulphide. The surprising observation has been made that the sulphide contained in these solutions immediately convert the said metal oxides, chiefly the colouring constituents, such as iron oxide, manganese oxide etc., into metal sulphides. At the same time by this treatment the heavy spar is considerably loosened, so that the dilute sulphide liquor penetrates through the pieces of heavy spar and at once converts the metal oxides.

The sulphides formed in this way can for the most part be removed by simply washing out with water. In order to be able to extract the sulphides which are not removed thus, the heavy spar is finely ground, preferably in the wet state, and then treated with a small quantity of mineral acid, e. g. sulphuric acid. The acid decomposes the sulphides and converts them into water-soluble form, whereupon they can be readily washed out. It is thus no longer necessary to purify the heavy spar by prolonged boiling with acid, as the metal sulphides immediately decompose and only require to be washed out. The pure white heavy spar is then dried.

A particular advantage of the method consists amongst other things, in this that in the aforedescribed treatment, the quartz which is present in most heavy spars, is simultaneously changed in such a way that during the subsequent washing and acid process it passes completely into solution, so that a perfectly pure $BaSO_4$ is formed from normal heavy spars.

Example 10 kgs. natural lump heavy spar free from bitumen is oxidized by calcination for a short time at 1300–1350° C. and then quenched in a 0.5–1% solution of barium sulphide. The separated metal sulphides are removed in a known manner by washing and the heavy spar is finely ground wet, the heavy spar liquor treated with 30–50 ccms. conc. sulphuric acid 1.84 and the pure white heavy spar dried after washing.

What I claim is:—

1. A method of purifying natural heavy spar consisting in calcining under oxidizing conditions at 1300–1350° C. lump heavy spar, quenching it in dilute solutions containing sulphide and removing the metal sulphides.

2. A method of purifying natural heavy spar consisting in calcining under oxidizing conditons at 1300–1350° C. lump heavy spar, quenching it in dilute solutions containing barium sulphide and removing the metal sulphides.

3. A method of purifying natural heavy spar consisting in calcining under oxidizing conditions at 1300–1350° C. lump heavy spar, quenching it in dilute solutions containing sulphide and washing the quenched heavy spar to remove the greater portion of the metal sulphides formed, finely grinding the heavy spar in the wet state, and thereupon treating it with a small amount of mineral acid, thereby dissolving the last portion of the metal sulphides, and washing again.

4. A method of purifying natural heavy spar consisting in calcining under oxidizing conditions at 1300–1350° C. lump heavy spar, quenching it in dilute solutions containing barium sulphide and washing the quenched heavy spar to remove the greater portion of the metal sulphides formed, finely grinding the heavy spar in the wet state, and thereupon treating it with a small amount of mineral acid, thereby dissolving the last portion of the metal sulphides, and washing again.

In testimony whereof I affix my signature:

JOHANNES MÜLLER.